(12) United States Patent
Ye

(10) Patent No.: US 11,874,080 B1
(45) Date of Patent: Jan. 16, 2024

(54) UNIVERSAL SUPPORTING MECHANISM

(71) Applicant: Xiaohui Ye, Ningbo (CN)

(72) Inventor: Xiaohui Ye, Ningbo (CN)

( * ) Notice: Subject to any disclaimer, the term of this patent is extended or adjusted under 35 U.S.C. 154(b) by 0 days.

(21) Appl. No.: 18/119,886

(22) Filed: Mar. 10, 2023

(30) Foreign Application Priority Data

Dec. 30, 2022 (CN) .......................... 202223611480.4

(51) Int. Cl.
| | |
|---|---|
| *F16M 11/14* | (2006.01) |
| *F41A 23/10* | (2006.01) |
| *F16M 11/04* | (2006.01) |
| *F16C 11/06* | (2006.01) |
| *F16C 11/10* | (2006.01) |

(52) U.S. Cl.
CPC ............. *F41A 23/10* (2013.01); *F16C 11/06* (2013.01); *F16C 11/0695* (2013.01); *F16C 11/106* (2013.01); *F16M 11/041* (2013.01); *F16M 11/14* (2013.01); *Y10T 403/32311* (2015.01); *Y10T 403/32631* (2015.01)

(58) Field of Classification Search
CPC .......... F41A 23/10; F41A 23/14; F41A 23/06; F16M 2200/022; F16M 11/14; F16M 11/16; F16C 11/106; F16C 11/06; F16C 11/0695; Y10T 403/32311; Y10T 403/32713; Y10T 403/32811
See application file for complete search history.

(56) References Cited

U.S. PATENT DOCUMENTS

| | | | | |
|---|---|---|---|---|
| 2,670,228 A | * | 2/1954 | Pagliuso ................ | F16M 11/14 285/267 |
| 2,752,116 A | * | 6/1956 | Minnis ................... | F16M 11/14 248/183.4 |
| 3,632,073 A | * | 1/1972 | Nakatani ............... | F16M 11/14 248/169 |
| 3,908,945 A | * | 9/1975 | Shapiro ................. | F16M 11/14 248/165 |
| 5,738,344 A | * | 4/1998 | Hagman ................ | F16M 11/14 269/20 |
| 5,957,445 A | * | 9/1999 | Hagman ................ | B23Q 1/545 269/75 |
| 7,111,836 B1 | * | 9/2006 | West ..................... | F16C 11/106 269/75 |
| 7,281,693 B2 | * | 10/2007 | Chou .................... | F16M 11/242 403/90 |

(Continued)

*Primary Examiner* — Bradley Duckworth
(74) *Attorney, Agent, or Firm* — Daniel M. Cohn; Howard M. Cohn

(57) ABSTRACT

A universal supporting mechanism includes a universal connecting component, a connecting base, and a bottom base. The universal connecting component includes a rotating portion and a connecting portion, the rotating portion is connected with the connecting portion. A cavity is defined in the connecting base, the rotating portion is located in the cavity, an opening is defined on a top of the connecting base, the opening is communicated with the cavity, the connecting portion extends outwards from the opening, the bottom base is connected with the connecting base, a reset component is disposed between the bottom base and the connecting portion. The rotating portion of the universal connecting component is disposed in the connecting base, and a reset mechanism is provided, so that the universal connecting component always has a trend of moving towards the opening.

11 Claims, 6 Drawing Sheets

(56) References Cited

U.S. PATENT DOCUMENTS

| | | | | |
|---|---|---|---|---|
| 7,426,800 B2* | 9/2008 | Pierce | ................... | F41A 23/10 |
| | | | | 89/37.04 |
| 7,753,330 B2* | 7/2010 | Brief | ................... | F16M 11/14 |
| | | | | 248/278.1 |
| 8,297,605 B2* | 10/2012 | Lee | ................... | F16M 13/022 |
| | | | | 269/130 |
| 8,402,684 B1* | 3/2013 | Beltz | ................... | F41A 23/10 |
| | | | | 42/72 |
| 8,511,625 B2* | 8/2013 | Stefan | ................... | F16C 11/106 |
| | | | | 248/288.51 |
| 8,740,161 B2* | 6/2014 | Hsu | ................... | F16M 13/022 |
| | | | | 248/205.8 |
| 10,161,706 B2* | 12/2018 | Roberts | ................... | F41A 23/10 |
| 10,378,579 B2* | 8/2019 | Grziwok | ............ | F16M 11/2078 |
| 10,419,649 B2* | 9/2019 | Gilbert | ................... | F16M 11/041 |
| 10,436,537 B2* | 10/2019 | Fudala | ................... | F41A 23/14 |
| 10,627,181 B2* | 4/2020 | Roberts | ................... | F41A 23/10 |
| 10,739,099 B2* | 8/2020 | Bowman | ................... | F41C 23/16 |
| 10,921,082 B2* | 2/2021 | Todd | ................... | F41A 23/10 |
| 11,098,840 B2* | 8/2021 | Ye | ................... | F16M 11/16 |
| 11,306,862 B1* | 4/2022 | Ye | ................... | F16M 11/14 |
| 11,353,781 B2* | 6/2022 | Zou | ................... | F16M 11/242 |
| 11,519,590 B2* | 12/2022 | Mai | ................... | F21V 21/084 |
| 2007/0152116 A1* | 7/2007 | Madsen | ................... | F16M 11/14 |
| | | | | 248/181.1 |
| 2021/0190261 A1* | 6/2021 | Warner | ................... | F16M 11/16 |
| 2021/0348711 A1* | 11/2021 | Kuriyama | ............ | F16M 11/242 |
| 2022/0065389 A1* | 3/2022 | Grover | ................... | F16C 11/0647 |

* cited by examiner

UNIVERSAL SUPPORTING MECHANISM

TECHNICAL FIELD

The present disclosure relates to a universal supporting mechanism applied to gunstocks or similar brackets.

BACKGROUND

Gunstocks are also called gun holders, gun brackets, firearm supports, etc. Such similar structures are also provided for some equipment required to be conveniently placed on different positions of the ground and required to be supported, such as small photography equipment and measuring equipment. In order to adapt to different application environments, a portion, configured to support gun barrels, of the gunstocks should be capable of flexibly adjusting position angles, the industry generally uses universal supporting mechanisms to cooperate with the portion, configured to support the gun barrels, of the gunstocks to achieve position angle adjustment. However, adjustment knobs of current universal supporting mechanisms may be loosened from connecting components after the current universal supporting mechanisms rotate multiple times, so that an overall supporting structure of the current universal supporting mechanisms is unstable.

SUMMARY

A technical problem to be solved by the present disclosure is to provide universal supporting mechanism that does not loosen after multiple times of use, so as to overcome defects in the prior art.

Technical solutions for solving the technical problem are as following.

The present disclosure provides a universal supporting mechanism, including a universal connecting component, a connecting base, and a bottom base. The universal connecting component includes a rotating portion and a connecting portion, the rotating portion is connected with the connecting portion. A cavity is defined in the connecting base, the rotating portion is located in the cavity, an opening is defined on a top of the connecting base, the opening is communicated with the cavity, the connecting portion extends outwards from the opening, the bottom base is connected with the connecting base, a reset component is disposed between the bottom base and the connecting portion, and the reset component enables the rotating portion to always have a trend of moving towards the opening.

Furthermore, a tray is disposed between the rotating portion and the reset component, the tray includes a lifting portion and a supporting portion, the lifting portion is connected with the supporting portion, and the lifting portion lifts the rotating portion.

Furthermore, a concave surface is defined on the lifting portion for matching with a spherical surface of the rotating portion.

Furthermore, the supporting portion is slidably connected with the bottom base along an axial direction of the cavity.

Furthermore, a guiding groove is defined on the supporting part, a guiding block is disposed on the bottom base, and the guiding block slides in the guiding groove along the axial direction of the cavity.

In one embodiment, the bottom base is fixedly connected to the connecting base.

Furthermore, the bottom base is threadedly connected to the connecting base in a first thread direction.

Furthermore, the universal supporting mechanism includes an adjustment mechanism, the adjustment mechanism is movably connected the bottom base.

Furthermore, the adjustment mechanism is threadedly connected to the bottom base in a second thread direction.

Furthermore, the first thread direction is opposite to the second thread direction.

In another embodiment, the bottom base is detachably connected to the connecting base.

Furthermore, the universal supporting mechanism includes an adjustment mechanism, the adjustment mechanism is movably connected the bottom base Furthermore, the adjustment mechanism is threadedly connected to the bottom base.

Furthermore, the adjustment mechanism includes a supporting end, and the supporting portion is connected to the supporting end.

Furthermore, the supporting portion includes a blind hole, and the supporting end is inserted into the blind hole.

Furthermore, the bottom base includes an abutting surface, a first end of the reset component abuts against the abutting surface, and a second end of the reset component abuts against a bottom surface of the lifting portion.

Furthermore, the connecting base includes a connecting position for connecting a supporting rod.

Furthermore, the connecting portion is connected to a lifting platform.

Furthermore, a maximum width of the opening is equal to or slight greater than a maximum diameter of the connecting portion.

Compared with the prior, advantages of the present disclosure are as following. The rotating portion of the universal connecting component is disposed in the connecting base, a reset mechanism is disposed between a bottom of the connecting base and the rotating portion, so that the universal connecting component always has the trend of moving towards the opening. Even though gun barrels are too heavy during use, the trend of moving towards the opening may be compensated through the adjustment mechanism, the reset mechanism and the adjustment mechanism are both located in the connecting base, which is stable in structure and not easy to be damaged. When the bottom base is not threadedly connected with the connecting base, the bottom base may not loosen after the rotating portion rotates multiple times. When the bottom base is threadedly connected with the connecting base, the adjustment mechanism is threadedly connected with the bottom base in an opposite threaded direction, and when friction force brought by rotation of the universal connecting component acts on the adjustment mechanism, threads in opposite directions enable the bottom base and the adjustment mechanism not loosen at the same time. The tray is not threadedly connected with the bottom base, so that the friction force brought by the rotation of the universal connecting component may hardly act on the bottom base, which further reduces possibility of loosening the bottom base.

DETAILED DESCRIPTION

Figure 1:
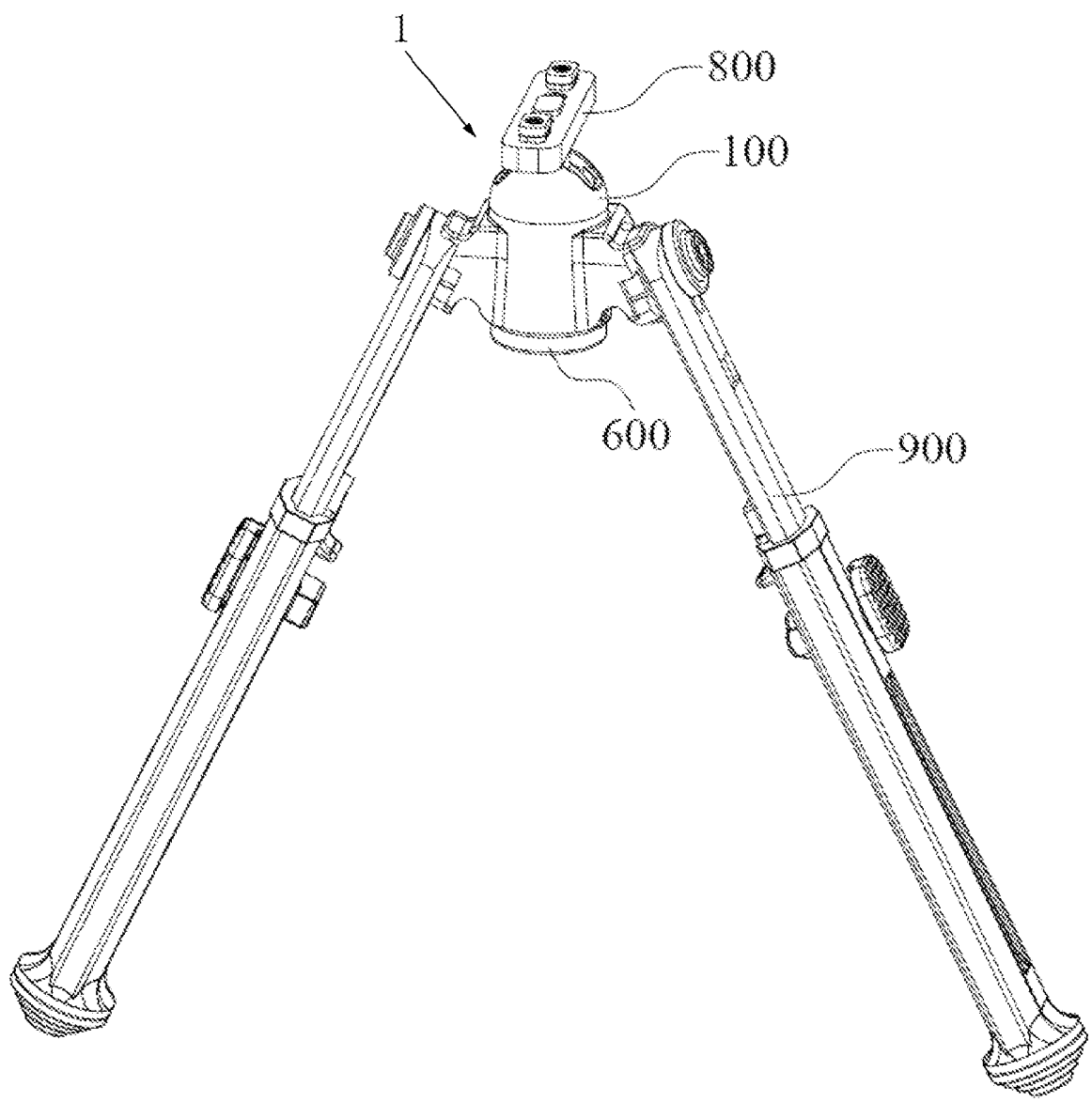
FIG. 1 is a structural schematic diagram of a gunstock of a universal supporting mechanism of the present disclosure.
Figure 2:
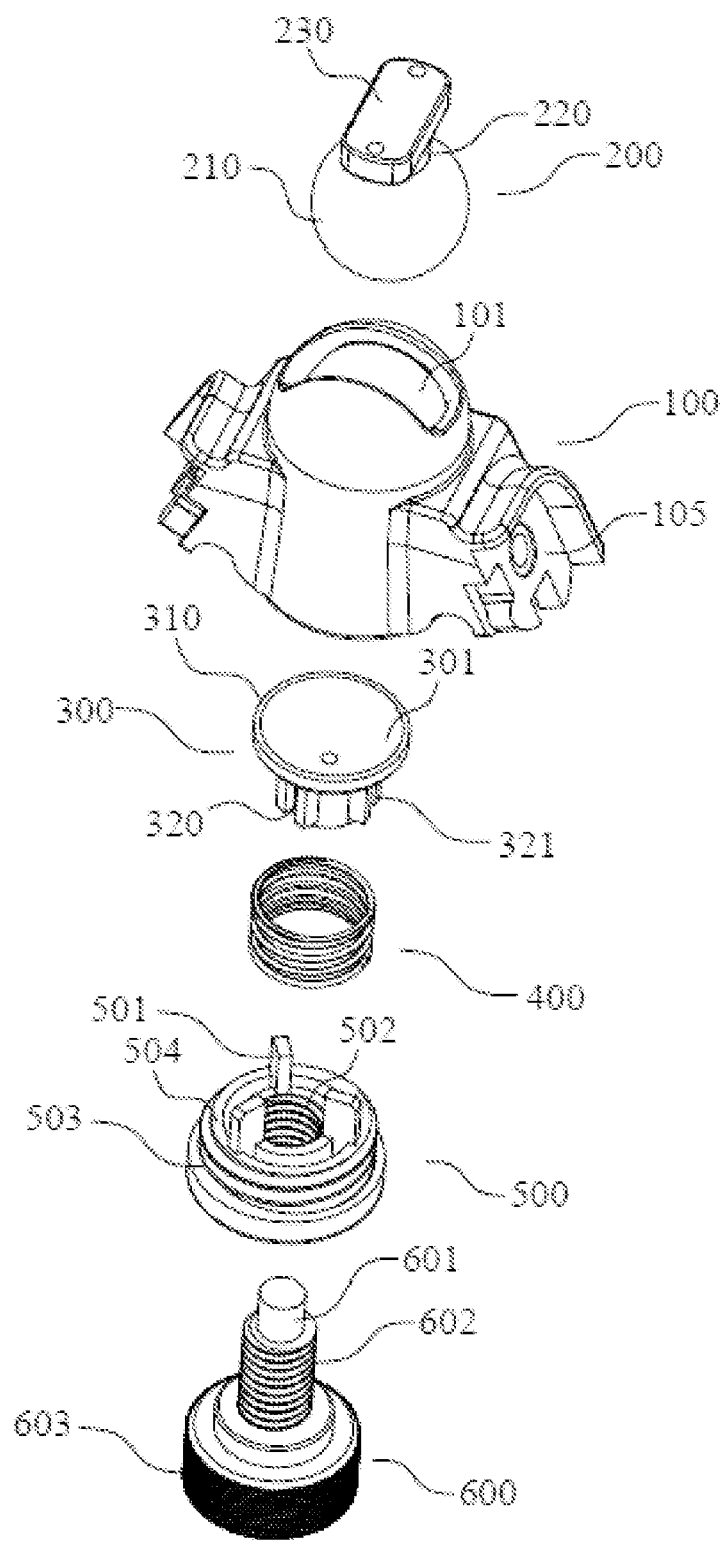
FIG. 2 is an exploded structural schematic diagram of the universal supporting mechanism of the present disclosure.

The present disclosure is described in further detail below with reference to the accompanying drawings.

As shown in FIGS. 1-5C, the present disclosure provides a universal supporting mechanism, including a connecting base 100, a universal connecting component 200, and a bottom base 500. The connecting base 100 is rotatably connected with the universal connecting component 200 in three-dimensional rotation. The bottom base 500 is fixedly connected or detachably connected to the connecting base 100. A cavity 102 is defined in the connecting base 100. The universal connecting component 200 includes a rotating portion 210 and a connecting portion 220, the rotating portion 210 is connected with the connecting portion 220. The rotating portion 210 is located in the cavity 102, an opening 101 is defined on a top of the connecting base 100, the opening 101 is communicated with the cavity 102, the connecting portion 220 extends outwards from the opening 101, the connecting portion 220 is connected to a platform base 230, the platform base 230 is connected to the lifting platform 800, the lifting platform 800 is configured to directly or indirectly support gun barrels or other small equipment required to be supported, such as measuring equipment and photography equipment. The connecting base 100 includes a connecting position 105 for connecting a supporting rod 900 to form a gunstock main body.

In one embodiment, the top of the connecting base 100 is a hemispherical or partial spherical surface, the opening 101 is an arc-shaped opening circumferentially defined on the spherical surface, an arc length of the arc-shaped opening determines a size of the opening 101 and a rotation angle of the universal connecting component 200 at the opening 101. For example, when a sphere center of the rotating portion 210 coincides with a sphere center of the hemispherical surface and the arc length of the opening 101 is one third of a circumference, a maximum rotation angle of the universal connecting component 200 at the opening 101 is 120 degrees. In other embodiments, the top of the connecting base 100 may be in other shapes, such as a plane. The opening 101 may be an elongated hole on the plane, such as a rectangular hole or a long circular hole, accordingly, a contact area between the universal connecting component 200 and an inner wall of the top of the connecting base 100 becomes smaller. In one embodiment, a maximum width of the opening 101 is equal to or slightly greater than a maximum diameter of the connecting portion 220, which ensures that the connecting portion 220 may only swing back and forth in the opening in a vertical plane where the opening 101 is located and may not move away from the vertical plane.

Figure 3:
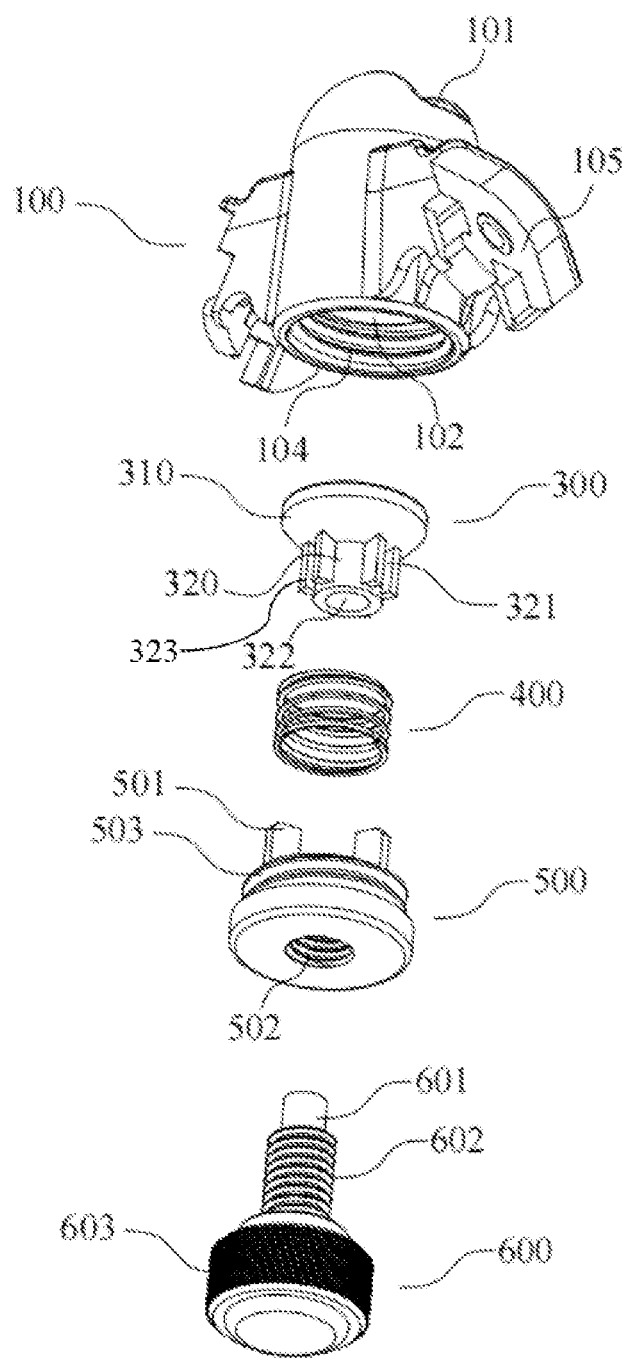
FIG. 3 is a partial exploded structural schematic diagram of the universal supporting mechanism of the present disclosure where a universal connecting component is removed.
Figure 4A:
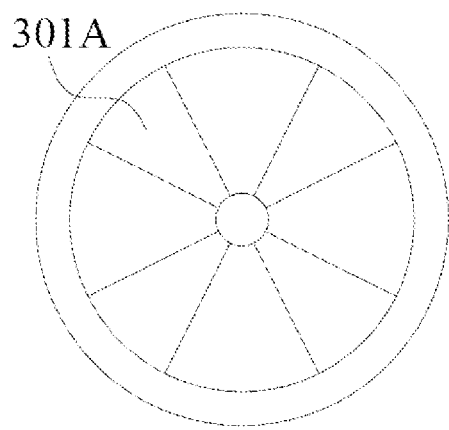
FIG. 4A is a schematic diagram of a first embodiment of a tray shown in a top view of the present disclosure.
Figure 4B:
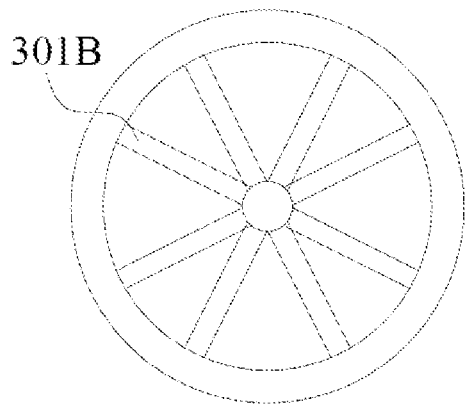
FIG. 4B is a schematic diagram of a second embodiment of the tray shown in a top view of the present disclosure.
Figure 4C:
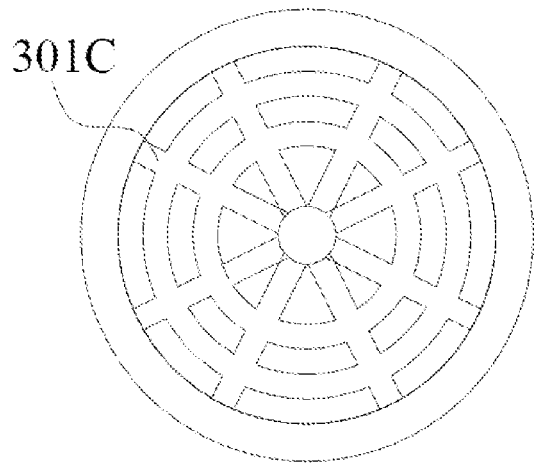
FIG. 4C is a schematic diagram of a third embodiment of the tray shown in a top view of the present disclosure.
Figure 5A:
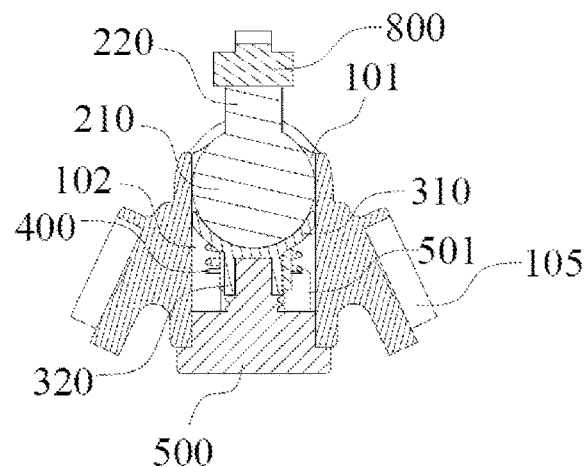
FIG. 5A is a schematic diagram of a first embodiment of the universal supporting mechanism shown in a top view of the present disclosure.
Figure 5B:
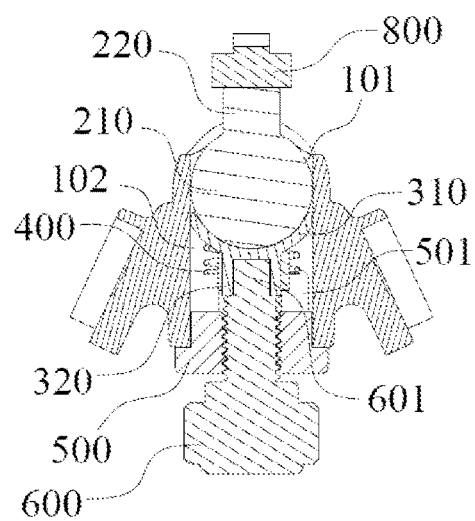
FIG. 5B is a schematic diagram of a second embodiment of the universal supporting mechanism shown in a top view of the present disclosure.
Figure 5C:
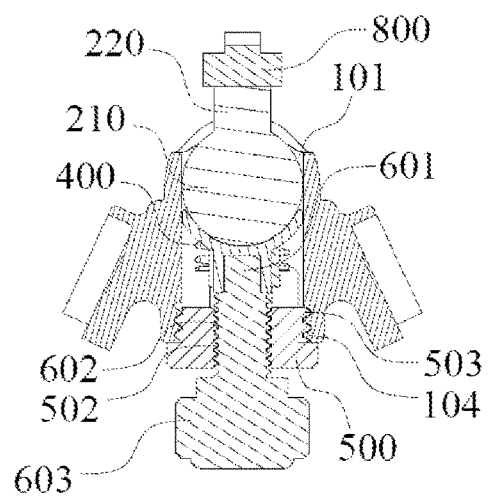
FIG. 5C is a schematic diagram of a third embodiment of the universal supporting mechanism shown in a top view of the present disclosure.

In one embodiment, the bottom base 500 is threadedly connected with the connecting base 100. As shown in FIGS. 3 and 5C, a first internal thread 104 is defined on a bottom of the connecting base 100, a first outer thread 503 is defined on the bottom base 500, and the first inner thread 104 and the first outer thread 503 are matched and connected in a first thread direction.

In one embodiment, the bottom base 500 is fixedly connected with the connecting base 100 through a connection method, such as interference fit or other methods which connects the bottom base 500 and the connecting base 100 in a undetachable way unless detaching by violence. In one embodiment, the bottom base 500 and the connecting base are integrally formed.

In one embodiment, a tray 300 is disposed in the connecting base 100. The tray includes a lifting portion 310 and a supporting portion 320. In one embodiment, a concave surface 301 is defined on the lifting portion 310 for matching with a spherical surface of the rotating portion 210. In some embodiments, as shown in FIG. 5A, the lifting portion 310 includes a plurality of discontinuous surfaces 301A, the plurality of the discontinuous surfaces 301A may be a part of the concave surface 301. In some embodiments, the lifting portion 310 includes other structures capable of lifting the rotating portion 210, such a radial lifting structure 301B (as shown in FIG. 5B) circumferentially extending along the spherical surface of the rotating portion 210 and a mesh lifting structure 301C (as shown in FIG. 5C). In other embodiments, any structure capable of lifting the rotating portion 210 upwards is applicable to the present disclosure. In a simplified embodiment, the tray 300 may be omitted, and a reset component 400 directly lifts the rotating portion 210 of the universal connecting component 200. The reset component 400 may be a compression spring or other elastic reset mechanisms, the tray 300 is connected to the bottom base 500 through the reset component 400, and the reset component 400 is compressed through the tray 300 and the bottom base 500 to be always in a compressed state. The reset component 400 is located in the cavity 102 and is always in the compressed state, so that the tray 300 always has a trend of moving away from the bottom base 500.

Figure 6A:
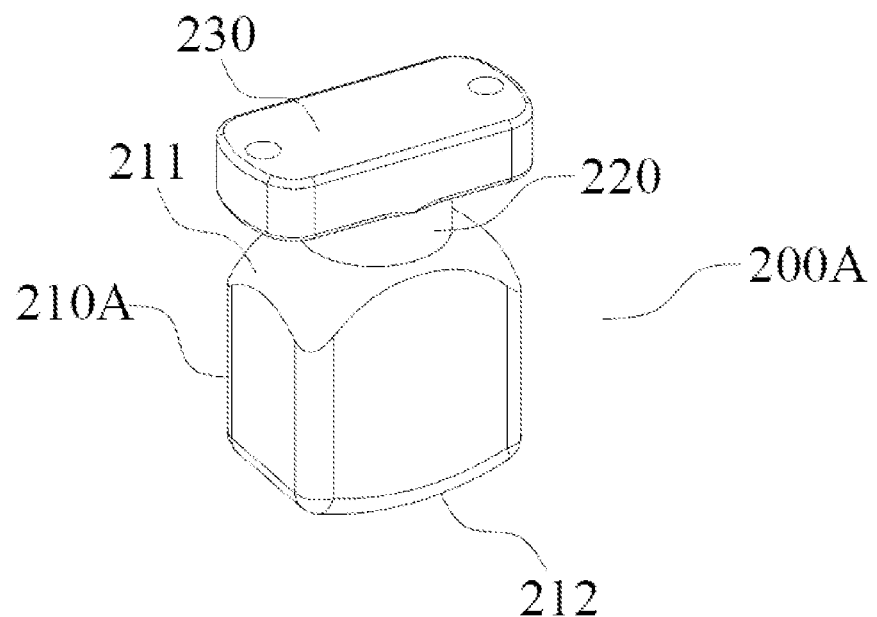
FIG. 6A is a schematic diagram of the universal connecting component shown in a first angle according to another embodiment of the present disclosure.
Figure 6B:
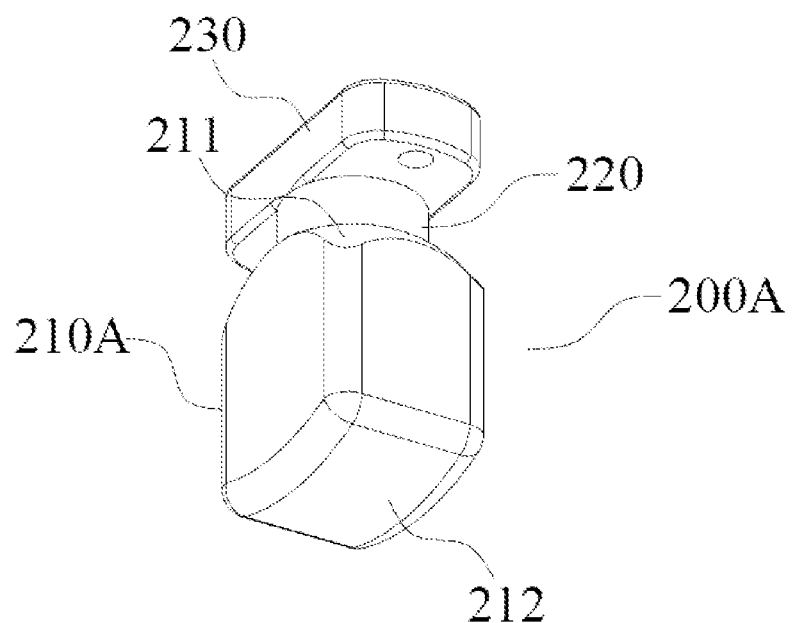
FIG. 6B is a schematic diagram of the universal connecting component shown in a second angle according to another embodiment of the present disclosure.

In some embodiments, as shown in FIGS. 6A and 6B, the rotating portion 210A of the universal connecting component 200 is not necessarily a ball, the rotating portion 210A includes a first rotating surface 211 and a second rotating surface 212, the first rotating surface 211 is close to the connecting portion 220 and is configured to contact an inner wall of the top of the connecting base 100 and rotate with respect to the inner wall of the top of the connecting base 100. The second rotating surface 212 is located at a bottom of the rotating portion 210A and is configured to contact the concave surface 301 of the lifting portion 310 of the tray 300 or other similar surfaces and rotate with respect to the concave surface 301 of the lifting portion 310 of the tray 300 or other similar surfaces. The first rotating surface 211 and the second rotating surface 212 may be a part of a cambered surface, a spherical surface, and a cylindrical surface.

The supporting portion 320 is matched and connected with the bottom base 500. In one embodiment, a guiding block 501 is disposed on the bottom base 500, a guiding groove 321 is defined on the supporting part 320, the guiding groove 321 cooperates with the guiding block 501, the guiding block 501 slides back and forth in the guiding groove 321 along the axial direction of the cavity 102 to change a distance between the bottom base 500 and the tray 300. In another embodiment, a position of the guiding block 501 is interchanged with a position of the guiding groove 321. In one embodiment, a first end of the reset component 400 is sleeved on the guiding block 501 and abuts against an abutting surface 504 of the bottom base 500, a second end of the reset component 400 is sleeved on the guiding groove 321 and abuts against a bottom surface of lifting portion 310. When the reset component 400 is a compression spring, a maximum distance between a lowest point of the bottom surface of the lifting portion 310 and the abutting surface 504 of the bottom base 500 is less than a natural length of the compression spring, so that the compression spring is ensured to be in a compressed state at any position. supporting blocks 323 are formed on an outer surface of the supporting portion 320, and the supporting blocks 323 are integrally formed with the supporting portion 320.

During assembly, the universal connecting component 200 is inserted into the cavity 102 through the bottom of the connecting base 100 until the connecting portion 220 of the universal connecting component extends out of the opening 101, an upper portion of the rotating portion 210 (or the first rotating surface 211) abuts against the inner wall of the top of the connecting base 100, a lower portion of the rotating portion 210 (or the second rotating surface 212) abuts against the lifting portion 310 of the tray 300. The first end of the reset component 400 and the second end of the reset component 400 respectively abut against a bottom surface of the abutting surface 504 and a bottom surface of the lifting portion 310, the bottom base 500 is fixedly connected or detachably connected to the bottom of the connecting base 100. When the bottom base 500 and the bottom of the connecting base 100 are integrally formed, other openings (not shown in the drawings) are defined on the cavity 102, the universal connecting component 200, the tray 300, and the reset component 400 may enter the cavity 102 through the other openings.

In some embodiments, the bottom base 500 is connected with an adjustment mechanism 600 for adjusting a distance between the tray 300 and the bottom base 500. As shown in FIGS. 2, 3, 5B, and 5C, the adjustment mechanism 600 includes a supporting end 601, the supporting end 601 abuts against the supporting portion 320. In one embodiment, a blind hole 322 is defined at a bottom of the supporting portion 320, the supporting portion 320 is inserted in the blind hole 322. In other embodiments, the supporting end 601 directly abuts against the bottom of the supporting portion 320. In some embodiments, since the reset component 400 enables the supporting portion 320 always have the trend of moving away from the bottom base 500, the supporting end 601 does not need always abut against the supporting portion 320 during use, and may be in a state of keeping slight contact with the supporting portion 320 or temporarily separating from the supporting portion 320. In one embodiment, the adjustment mechanism 600 is threadedly connected with the bottom base 500, as shown in FIG. 6B or 5C, a second inner thread 502 is defined on the bottom base 500, a second outer thread 602 is defined on the adjustment mechanism 600, and the second inner thread 502 and the second outer thread 602 are matched and connected in a second thread direction. In the embodiment shown in FIG. 5B, when the bottom base 500 and the connecting base 100 are detachably connected or fixedly connected in non-threaded connection, the first thread direction may be clockwise or counterclockwise. In the embodiment shown in FIG. 5C, the first thread direction and the second thread direction may be the same (either clockwise or counterclockwise) or opposite. When the first thread direction is the same as the second thread direction, the bottom base 500 and the adjustment mechanism 600 may still respectively loosen or even loosen at the same during use or after using multiple times. However, when the first thread direction is opposite to the second thread direction, the situations that the bottom base 500 and the adjustment mechanism 600 may still respectively loosen or even loosen at the same during use or after using multiple times may be better avoided.

In some embodiment, the universal mechanism does not include an additional adjustment mechanism, as shown in FIG. 5A, the distance between the bottom base 500 and the tray is only adaptively adjusted by the reset component 400. When using a gunstock, a weight of a gun barrel is applied or partially applied to the try 300, so that the reset component 400 is respectively compressed.

In one embodiment, the second outer thread 602 is located on an outer portion of the adjustment mechanism 600, a first end, inserting into the cavity 102, of the adjustment mechanism 600 is the supporting end, and a second end of the adjustment mechanism 600 is a controlling end 603. The supporting end 601 moves towards the opening 101 or away from the opening 101. When the reset component 400 is insufficient to maintain the trend of moving of the tray 300 due to a long-term use or breakdown, the adjustment mechanism 600 may also be screwed into the cavity 102 for a longer distance to provide compensation.

In one embodiment, a gunstock 1 is provided with the universal supporting mechanism of the present disclosure, when the gunstock is in a condition of rest, under action of the reset component 400, the upper portion of the rotating portion 210 (or the first rotating surface 211) of the universal supporting component 200 abuts against the inner wall of the top of the connecting base 100, the lower portion of the rotating portion 210 (or the second rotating surface 212) contacts the lifting portion 310 of the tray 300, the reset component 400 is in the compressed state, and the supporting end 601 of the adjustment mechanism 600 is located in the blind hole 322 at the bottom of the supporting portion 320. When the gunstock is in use, the gun barrel is placed on the lifting platform 800, a certain downward pressure is applied to the universal connecting component 200, the upper portion of the rotating portion 210 (or the first rotating surface 211) may keep contacting the inner wall of the top of the connecting base 100, or may be separated with the inner wall of the top of the connecting base 100 due to too large pressure applied by the gun barrel, at this time, the adjustment mechanism 600 needs to be screwed inward a certain distance for counteracting the pressure applied by the gun barrel, so that the rotating portion 210 of the universal connecting component 200 is ensured to keep in a state equivalent to that in a condition of rest, so as to ensure stability in a use process.

When a position angle of the gun barrel needs to be adjusted, the connecting portion 220 swings in the opening 101 to adjust a vertical position angle of the gun barrel, the rotating portion 210 rotates in the cavity 102 to adjust a horizontal position angle of the gun barrel, the connecting portion 220 cooperates with the rotating portion 210 to adjust a three-dimensional position angle of the gun barrel.

What is claimed is:

1. A universal supporting mechanism, comprising:
 a universal connecting component;
 a connecting base; and a bottom base;

wherein the universal connecting component comprises a rotating portion and a connecting portion, the rotating portion is connected with the connecting portion; a cavity is defined in the connecting base, the rotating portion is located in the cavity, an opening is defined on a top of the connecting base, the opening is communicated with the cavity, the connecting portion extends outwards from the opening, the bottom base is connected with the connecting base, a reset component is disposed between the bottom base and the connecting portion, and the reset component enables the rotating portion to always have a trend of moving towards the opening;

wherein a tray is disposed between the rotating portion and the reset component, the tray comprises a lifting portion and a supporting portion, the lifting portion is connected with the supporting portion, the lifting portion lifts the rotating portion, a concave surface is defined on the lifting portion for matching with a spherical surface of the rotating portion, and the supporting portion is slidably connected with the bottom base along an axial direction of the cavity;

Wherein supporting blocks are formed on an outer surface of the supporting portion, the supporting blocks are integrally formed with the supporting portion, a guiding groove is defined on the supporting portion, a guiding block is disposed on the bottom base and the guiding block slides in the guiding groove along the axial direction of the cavity to change a distance between the bottom base and the tray;

wherein the universal supporting mechanism further comprises an adjustment mechanism, the adjustment mechanism is threadedly connected to the bottom base, wherein the adjustment mechanism comprises a supporting end, and a bottom surface of the supporting portion is connected to the supporting end.

2. The universal supporting mechanism according to claim 1, wherein the bottom base is fixedly connected to the connecting base.

3. The universal supporting mechanism according to claim 1, wherein the bottom base is detachably connected to the connecting base.

4. The universal supporting mechanism according to claim 3, wherein the bottom base is threadedly connected to the connecting base in a first thread direction.

5. The universal supporting mechanism according to claim 1, wherein the adjustment mechanism is threadedly connected to the bottom base in a second thread direction.

6. The universal supporting mechanism according to claim 5, wherein the first thread direction is opposite to the second thread direction.

7. The universal supporting mechanism according to claim 1, wherein the bottom base comprises an abutting surface, a first end of the reset component abuts against the abutting surface, and a second end of the reset component abuts against a bottom surface of the lifting portion.

8. The universal supporting mechanism according to claim 1, wherein the connecting base comprises a connecting position for connecting a supporting rod.

9. The universal supporting mechanism according to claim 1, wherein the connecting portion is connected to a lifting platform.

10. The universal supporting mechanism according to claim 1, wherein a maximum width of the opening is equal to or slight greater than a maximum diameter of the connecting portion.

11. A gunstock, comprising:
the universal supporting mechanism according to claim 1.

* * * * *